United States Patent [19]
Spencer

[11] 3,722,219
[45] Mar. 27, 1973

[54] VARIABLE AREA INJECTOR FOR ROCKET ENGINE

[75] Inventor: Duane Robert Spencer, Redondo Beach, Calif.

[73] Assignee: The United States of America as represented by the Secretary of the Navy

[22] Filed: Apr. 26, 1971

[21] Appl. No.: 137,633

[52] U.S. Cl. ............................................60/39.74 A
[51] Int. Cl. ..............................................F02g 1/00
[58] Field of Search........60/258, 39.74 A; 239/416, 416.4

[56] References Cited

UNITED STATES PATENTS

| | | |
|---|---|---|
| 3,623,319 | 11/1971 | Schneider........................60/39.74 A |
| 3,430,863 | 3/1969 | Canavan et al.........................60/258 |
| 3,431,732 | 3/1969 | Lovingham et al......................60/258 |
| 3,488,951 | 1/1970 | Chamberlain et al. ..................60/258 |

*Primary Examiner*—Samuel Feinberg
*Attorney*—R. S. Sciascia and Thomas O. Watson, Jr.

[57] ABSTRACT

A device for varying the thrust of a rocket engine either before or during flight, and for adjusting the mixture ratio easily and quickly during engine burn. A variable area fuel injector having concentric sleeves which are independently axially moveable for respectively controlling the flow of fuel and oxidizer independently of one another is provided for this purpose. These sleeves are threadably engaged with the rocket and a fixed pintle therein for permitting this axially movement.

2 Claims, 1 Drawing Figure

PATENTED MAR 27 1973
3,722,219
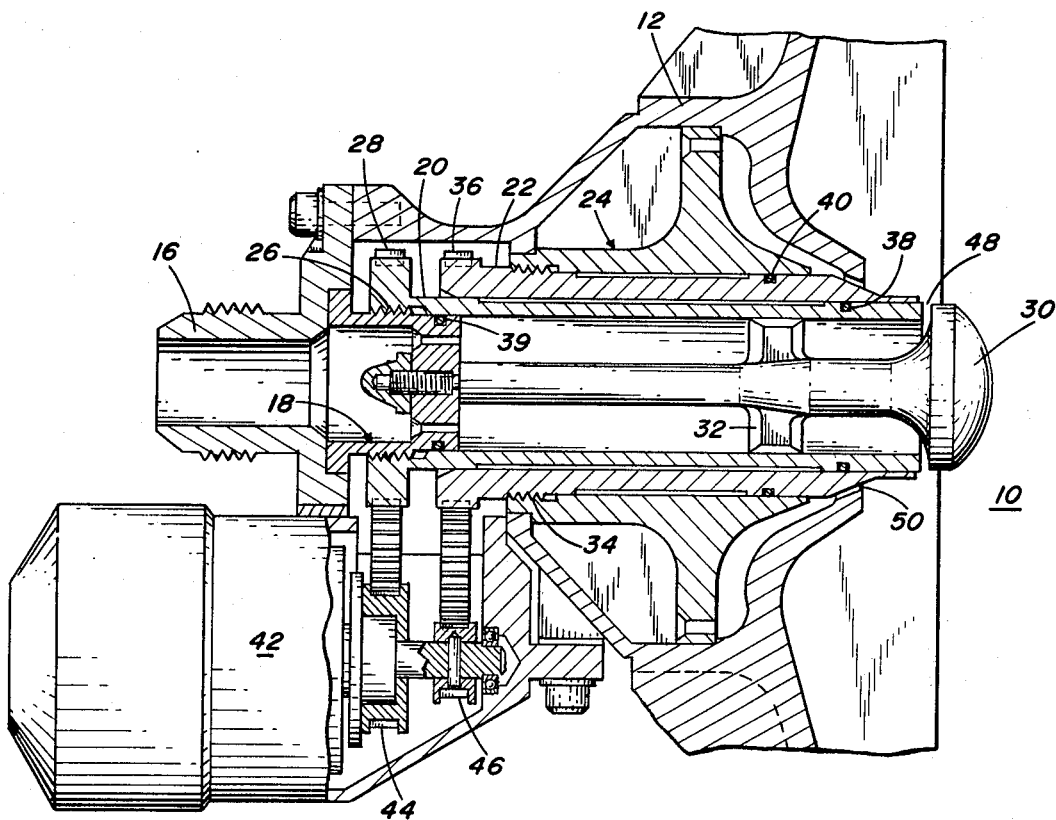
INVENTOR.
DUANE ROBERT SPENCER
BY Thomas O. Watson Jr.
ATTORNEY

3,722,219

VARIABLE AREA INJECTOR FOR ROCKET ENGINE

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

This invention relates to rocket engines and more particularly relates to systems for varying the thrust of rocket engine either before or during firing.

A typical rocket engine comprises propellant storage tanks, an injector, a combustion chamber, a throat region and a nozzle. The propellants are introduced into the combustion chamber through the injector and ignited. Ignition typically occurs either by an ignitor or by hypergolic ignition.

Propellants are usually pressurized in one of two ways. In larger engines, pumps are provided which are driven by a turbine. In smaller engines, the tanks are usually pressurized or else a separate gas generator is employed to pressurize the propellant.

It is often desirable in either type of propellant pressurization systems to have a constant thrust engine. Thrust is directly proportional to the combustion chamber pressure, which in turn, is a function of a mass flow rate and mixture ratio of the propellants. Many attempts have been made to ensure constant chamber pressure.

One attempt to provide this constant chamber pressure has been the provision of a system of pressure regulators accurately controlling the flow rate of the propellants. The pressure regulator maintains propellant injection into the combustion chamber at a constant rate which is suppose to provide constant pressure. Disadvantages of this type of control include a lack of compensation for variations in propellant viscosity, particularly with cryogenics. When the viscosity changes, the mass flow rate will change which affects chamber pressure. Another disadvantage is a lack of accurate control over the mixture ratio. Pressure regulators are particularly necessary where pressurized tanks are used because the pressure decays with depletion of propellant. Where pumps are used, it is even more difficult to control flow rate due to the complexity and the presence of many moving parts.

Several attempts have been made to alleviate these problems. One method employs a hydraulic balance mechanism. In this system a piston under pressure from hydraulic fluid on one side and combustion chamber pressure on the other controls the open area of the injector. When combustion chamber pressure drops the hydraulic pressure moves the piston to increase the open area of the injector. This method, while satisfactory in many respects, has the disadvantage of requiring precise independent control of the hydraulic pressure.

Another approach is to provide a spring operated sleeve which tends to close the injector area. The spring bias is opposed by the combustion chamber pressure such that as pressure increases the injector area will decrease. The difficulty with this type of system is that the use of a linear type spring will not provide constant pressure. That is, the force of the spring is a function of the distance through which the spring moves. An acceptable solution to this problem is provided by using two different types of springs which when added together in parallel provide a constant bias regardless of spring position. The difficulty with this solution is that the springs must be carefully selected and designed to produce a constant force in a particular region of operation. Also the two spring systems cannot provide for any variation in the mixture ratio.

SUMMARY OF THE INVENTION

The purpose of this invention is to provide a system for varying the thrust of a rocket engine. It also provides for adjustment of the mixture ratio of fuel and oxidizer. The variable adjustments allow correction of propellant flow during temperature and pressure flucuations and also minimizes the viscosity affect associated with gel propellants.

The system provides two concentric variably adjustable sleeves which independently adjust the fuel flow and oxidizer flow. The inner sleeve varies space between the end of the sleeve and a pintle to adjust fuel flow. The outer sleeve varies the space between the end of the sleeve and a port to control the oxidizer flow.

OBJECTS OF THE INVENTION

It is an object of the present invention to provide a system for varying the thrust of a rocket engine.

It is a further object of the invention to allow mixture ratio adjustment of fuel and oxidizer.

Yet another object of the present invention is to provide a system which permits correction of propellant flow during temperature and pressure flucuations.

Still another object of the present invention is to provide a variably adjustable system which minimizes the viscosity effect associated with different propellants.

Other objects, advantages and novel features of the invention will become apparent from the following detailed description of the invention when considered in conjunction with the accompanying drawings.

BRIEF DESCRIPTION OF THE DRAWING

FIG. 1 is a view, partially in cross-section, illustrating the injector assembly employing the features of this invention.

DETAILED DESCRIPTION OF THE PREFERRED EMBODIMENT

The structure shown in the drawing represents a preferred embodiment of the novel injector assembly. The combustion chamber and nozzle structure has been omitted for purposes of clarification. The area shown at 10 represents the combustion chamber. The injector assembly includes a housing 12 and cover 16 which has a threaded nipple for connecting a fuel supply line. Attached to the cover 16 is an annular pintle support 18. The concentric variably adjustable sleeves are shown at 20 and 22 and are supported between pintle support 18 and annular ring 24. Fuel flow adjustment is provided by inner sleeve 20 which is threaded at 26. The pintle support 18 is likewise threaded at 26. A fixed pintle 30 is attached to pintle support 18 with alignment spacers provided at 32. The alignment spacers 32 may be flanges extending from the fixed pintle 30. The alignment spacers 32 maintain the pintle 30 centered in sleeve 20. The outer sleeve 22 is threaded at 34 and engages threads in annular ring 24. The threaded portions of concentric sleeves 20, 22 are protected from contamination by O-ring seals at 38, 39 and 40. The concentric sleeves 20, 22 have gear teeth at 28 and 36 respectively and are adjusted by rotating them through gear drive mechanism and actuator shown at 42.

In operation the drive mechanism 44 rotates the inner sleeve 20 to move it in or out to control the fuel port 48 between itself and the fixed pintle 30. Another drive mechanism rotates outer sleeve 22 to move it in or out thus adjusting the oxidizer port 50 between the sleeve 22 and the housing 12. The number and angle of the threads 26 and 34 are determined by the pressure, length of movement, driving torque, etc., that can be determined for any specific rocket engine. The drive mechanisms 44 and 46 are separate and provide independent control of oxidizer and fuel. Any drive mechanism which can provide independent control of the adjustable sleeves 20 and 22 may be used.

Thus there has been disclosed an injector system which provides excellant control of propellant flow and mixture. Obviously many modifications and variations of the present invention are possible in the light of the above teachings.

What is claimed is:

1. Apparatus for varying the thrust of a rocket engine comprising:
   a housing;
   an enlongated fixed pintle;
   a first movable sleeve, having a threaded portion, concentric with and substantially surrounding said pintle and forming with said pintle an annular opening for injection of a first propellant;
   a second movable sleeve, having a threaded portion, concentric with and of a larger diameter than said first movable sleeve and forming with said housing an annular opening for injection of a second propellant; and,
   drive means for rotating said first and second movable sleeves independently of each other to independently vary the area of said annular openings.

2. The apparatus of claim 1 wherein said first movable sleeve is solid.

* * * * *